UNITED STATES PATENT OFFICE.

HERMANN MELZER, OF BERLIN, GERMANY, ASSIGNOR TO THE CHEMISCHE FABRIK AUF ACTIEN, VORMALS E. SCHERING, OF SAME PLACE.

PROCESS OF DISINFECTING.

SPECIFICATION forming part of Letters Patent No. 665,794, dated January 8, 1901.

Application filed June 9, 1899. Serial No. 719,966. (No specimens.)

*To all whom it may concern:*

Be it known that I, HERMANN MELZER, a subject of the Emperor of Germany, residing at 73 Rathenowerstrasse, Berlin, in the German Empire, have invented certain new and useful Improvements in Processes of Disinfecting; and I do hereby declare the following to be a full, clear, and exact description of the invention, such as will enable others skilled in the art to which it appertains to make and use the same.

My invention has reference to a process of disinfecting by formaldehyde, the objects of my invention being to do away with the use of troublesome apparatus and special fuel ordinarily required, to avoid danger from fire, and generally to simplify and cheapen the disinfecting process, while making it thorough. With these objects in view I take a substance which will produce formaldehyde gas by the mere action of heat and also a body which reacts with water with great development of heat, and these two substances are combined with water. The substance which produces formaldehyde may be any suitable body or liquid containing or producing formaldehyde—as, for instance, paraformaldehyde. The body which reacts with water, producing great development of heat, may be, *e. g.*, an alkaline earth, such as burnt lime or caustic alkalies. With the use of burnt lime, which is especially practical, the caloric energy produced by the reaction with water passes off in the form of steam, and formaldehyde is developed in the form of a gas with great rapidity and very thoroughly from the formaldehyde-producing body which has been added to or mixed with the burnt lime and water. By this means I secure in the most simple and automatic manner those factors which are considered essential for effective disinfection by formaldehyde—first, a rapid filling of the space to be disinfected with the necessary quantity of formaldehyde gas, and, secondly, a simultaneous supply of large quantities of the vapor of water. Very good results are attained with a mixture of burnt lime and polymeric formaldehyde—for instance, paraformaldehyde. This mixture may be, if convenient, pressed into tablet or other suitable form and put up and shipped in that form ready for use.

To disinfect or deodorize a space, one needs only to combine the mixture, in the form described or broken up into smaller pieces, if desired, with the necessary quantity of water, whereupon in a very short time an active development of the vapor of water and formaldehyde gas ensues. It will be advantageous to use the water warm.

In place of polymeric formaldehyde either formaldehyde-producing bodies or liquids in combination with burnt lime, &c., can also be used—as, for instance, formaldehyde solution or any combination which easily gives off formaldehyde gas by the action of heat. If formaldehyde solution be employed, the manner of proceeding to disinfect a room, for instance, is to bring the burnt lime, preferably in the form of coarse-grained pieces, into contact with a sufficient quantity of formaldehyde solution, preferably diluted with water. The reaction then takes place as before.

The advantages of this method and means of disinfecting by formaldehyde gas are obvious. I thereby avoid the use of a special apparatus and special fuel. There is an automatic but effective development of water, vapor, and formaldehyde gas, and the method and means are cheap, simple, and easily used, but thoroughly effective.

In the following claims the term "formaldehyde" is intended to apply either to the case where that substance is used as such or in other forms, such as polymeric formaldehyde.

Having thus described my invention, what I claim as new, and desire to secure by Letters Patent, is—

1. The herein-described process of evolving disinfecting-vapors, which consists in mixing formaldehyde, water and a body evolving heat in contact with water, in such quantities as will produce sufficient heat to evolve vapors, substantially as specified.

2. The herein-described process of evolving disinfecting-vapors, which consists in adding burnt lime to a watery solution of formaldehyde in such quantity as to evolve vapors, substantially as specified.

In testimony whereof I affix my signature in presence of two witnesses.

HERMANN MELZER.

Witnesses:
   HENRY HASPER,
   WOLDEMAR HAUPT.